United States Patent [19]
Matsumi et al.

[11] Patent Number: 5,446,597
[45] Date of Patent: Aug. 29, 1995

[54] APPARATUS FOR RECORDING DIGITAL SIGNALS WITH ASSOCIATED AUXILIARY DATA

[75] Inventors: Chiyoko Matsumi, Suita; Tatsuro Juri, Osaka; Akira Iketani, Higashiosaka; Shinji Hamai, Osaka, all of Japan

[73] Assignee: Matsushita Electric Industrial Co., Ltd., Osaka, Japan

[21] Appl. No.: 208,301

[22] Filed: Mar. 10, 1994

[51] Int. Cl.6 .................................................. G11B 5/02
[52] U.S. Cl. ..................................... 360/19.1; 360/48; 358/343
[58] Field of Search .................. 360/19.1, 22, 29, 33.1, 360/18, 48, 32, 61; 358/335, 341, 343

[56] References Cited
U.S. PATENT DOCUMENTS 5,218,454  6/1993  Nagawasa et al. ............ 360/19.1 X
5,311,372  5/1994  Matsumi et al. .................... 360/19.1

Primary Examiner—Andrew L. Sniezek
Attorney, Agent, or Firm—Wenderoth, Lind & Ponack

[57] ABSTRACT

In order to reproduce highly important information easily and at high speed, such information is composed into data of fixed length and is assigned from the beginning of a block. Without increasing the recording rate, in order to record a signal so that the highly important information may be reproduced securely, a dummy sync block is inserted immediately before a data sync block which contains the highly important information for defining or explaining the content of the signal to be recorded. To maintain the error correction capability in a normal play mode, moreover, the sync block composition which is the same as in the signal to be recorded is used for the highly important information. In particular, as for such information, by assigning the information in plural sync blocks, reproduction is securely realized also in the case of a trick play mode.

7 Claims, 7 Drawing Sheets

APPARATUS FOR RECORDING DIGITAL SIGNALS WITH ASSOCIATED AUXILIARY DATA

BACKGROUND OF THE INVENTION

1. Field of the Invention

The present invention relates to an apparatus for recording auxiliary data on a recording medium while recording digital video signals and/or audio signals.

2. Description of the Prior Art

When recording and reproducing a video signal and an audio signal, it is necessary to simultaneously record and reproduce auxiliary data for describing characteristics of the recorded/reproduced video and/or audio signal. The auxiliary data includes, for example, information indicative of whether the video signal is of a 50 Hz system or of a 60 Hz system, information indicative of the number of samples of audio signals assigned in a block composed in synchronization with the video signal, and other information that, if once lose, makes it impossible to reproduce the entire signal. As a conventional digital signal recording system, a digital audio tape-recording system (DAT) for recording only audio signals may be listed. In DAT, tracks formed on a magnetic tape are divided into main areas for recording audio signals, and first and second sub areas as regions for recording other information, by means of IBG (inter block gap) which is a buffer region for editing. The auxiliary data is divided and recorded into a main ID which is a block address of main data block for composing the main area, and a sub ID of sub data which is a block address of a sub data block for composing the sub area.

In such a recording method, however, since the error correction code for auxiliary data is set only for the one which is lower in capacity than the error correction code for the audio signal, the error correction capacity can be guaranteed only by recording repeatedly. Further, when the audio signal and the auxiliary data are recorded in different regions, the necessary auxiliary data may be mistakenly lost in the case of editing or the like.

Furthermore, when recording audio signals, auxiliary data may be assigned in the block address, but when a video signal is recorded by employing a similar recording method, since the quantity of information to be recorded is enormous, it is difficult to further increase the recording rate by repeatedly recording into the block address. When recording an audio signal, meanwhile, it is not necessary to consider the output of data in a trick play mode, but when a video signal is recorded by employing a similar recording method, a trick play mode is an indispensable function. The particularly important data in the auxiliary data in a trick play mode must be protected from magnetic tap scratches, error due to long burst, or synchronous block detection error.

SUMMARY OF THE INVENTION

It is hence a primary object of the invention to solve the problems of the conventional digital signal recording method.

That is, it is an object of the invention to provide an apparatus for recording auxiliary data so that the recorded auxiliary data can be easily detected during reproduction.

It is another object of the invention to provide a recording apparatus which can allow reliable detection of the sync block in which auxiliary data is disposed whether in a normal play mode or in a trick play mode, without increasing the recording rate.

It is a further object of the invention to sufficiently guarantee the error correction capability in a normal play mode.

It is a still further object of the invention to avoid the incidence of loss of the entire signal, even if the sync block containing the auxiliary data is broken due to a scratch or long burst in the tape, in a normal play mode.

In one aspect of the invention, a block group is composed of a plurality of continuously disposed sync blocks comprising a sync pattern, a block address and at least one error correction codeword that consists of data symbols and parity symbols. When one or a plurality of block groups are distributed into one track, the reproduction synchronism establishing function is enforced by recording a dummy synch block immediately before the sync block in which auxiliary data is assigned as data to be recorded.

According to this recording apparatus, by constituting the data so as to give a dummy sync block for the sync block in which auxiliary data is disposed, it is possible to securely detect the sync block in which the auxiliary data is disposed whether in a normal play mode or in a trick play mode, without increasing the recording rate. It is thus possible to avoid the incidence of loss of the entire signal due to loss of slight auxiliary data.

In another aspect of the invention, when recording one or a plurality of block groups by distributing in one track, the data for recording the auxiliary data is recorded by assigning together into one or a plurality of sync blocks belonging to the same block group.

According to this recording apparatus, both inner parities and outer parities are added to the auxiliary data in the same way as the video signal and audio signal, so that the error detection ability in a normal play mode is sufficient. Further, as for the information of which loss makes it impossible to reproduce the video signal, by recording such information in plural parts on a region, if either auxiliary data sync block is broken due to a scratch or long burst on the recording medium, the incident of loss of the entire signal can be avoided.

DESCRIPTION OF THE PREFERRED EMBODIMENTS

Figure 1:
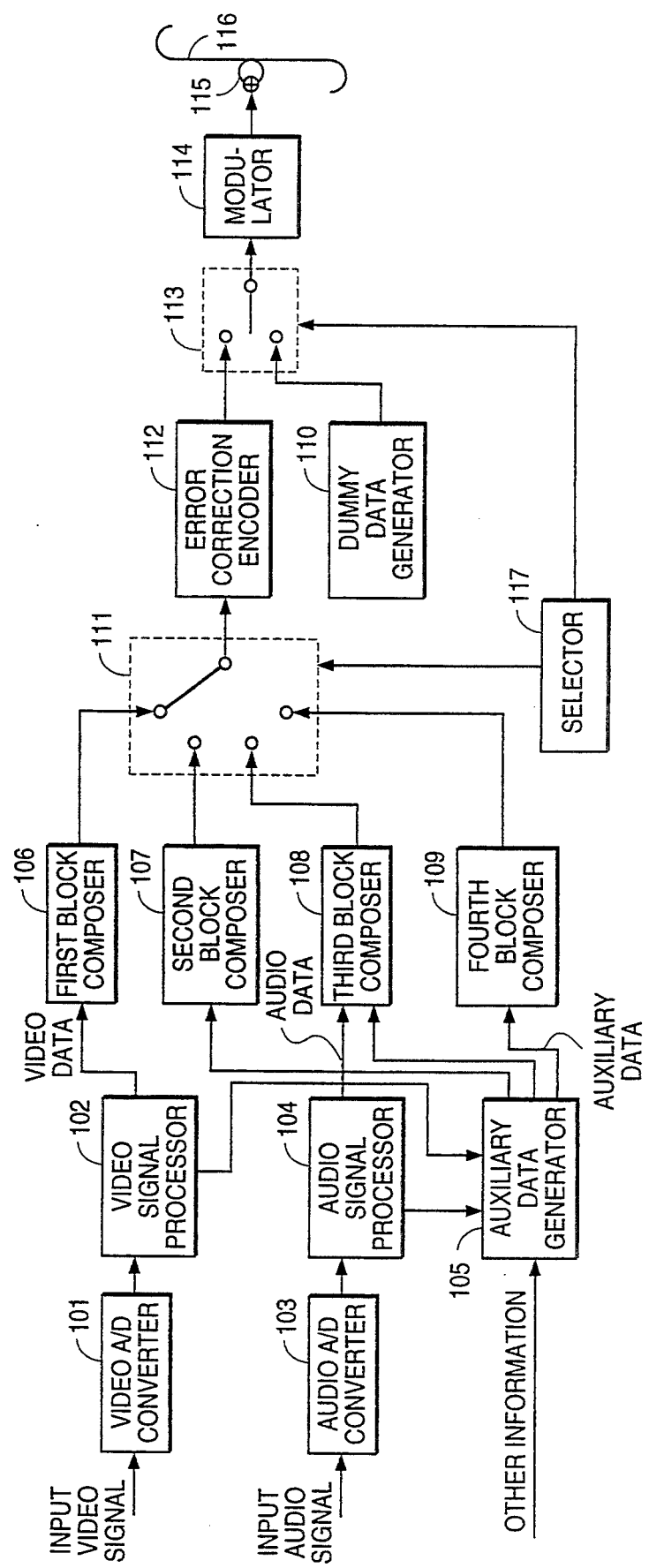
FIG. 1 is a block diagram of a digital signal recording apparatus in a first embodiment of the invention.

FIG. 1 shows a digital video cassette recorder (VCR) as a first embodiment of a digital data recording apparatus of the invention.

An input analog video signal is converted into a digital video signal in a video A/D converter 101. The digital video signal is fed into a video signal processor 102 to undergo filtering, shuffling, bit rate reduction encoding, etc. to become video data, which is issued into a first block composer 106. The input analog audio signal is converted into a digital audio signal in an audio A/D converter 103. The digital audio signal is sent into an audio signal processor 104 to undergo shuffling, encoding, etc. to become audio data, which is issued into a third block composer 108. The type of the input video signal, encoding method, and other information necessary in decoding are fed from the video signal processor 102 into an auxiliary data generator 105. The sampling frequency of the audio signal, sampling bit width and other information are also fed from the audio signal processor 104 into the auxiliary data generator 105. Furthermore, the recording time, recording data and other information are created, and the time code and other information necessary for retrieval are generated. Moreover, teletext, program title given by user and other such information may be fed into the auxiliary data generator 105 as other information. Those information for restoration, information for retrieval, information such as program title, and other information are composed into auxiliary data of fixed length of 5 bytes in the auxiliary data generator 105. The auxiliary data is issued into the second block composer 107, the third block composer 108 and the fourth block composer 109. Particularly, the auxiliary data regarding the video signal is issued into a second block composer 107, and the auxiliary data regarding the audio signal is issued into the third block 108, and the auxiliary data necessary for retrieval is issued into a fourth block composer 109. In the first block composer 106, as shown in FIG. 2(a), the input video data is composed into a first block of 77 bytes. In the second block composer 17, as shown in FIG. 2(b), the input auxiliary data regarding the video signal is composed into a second block of 77 bytes. As this time, the second block composer 107 arranges the auxiliary data by filling in from the beginning of a second block, and dummy data is recorded in the final 2 bytes.

In the third block composer 108, the input auxiliary data and audio data are composed into a third block of 77 bytes as shown in FIG. 2(c). At this time, the third block composer 108 places one piece of auxiliary data at the beginning of the third block, and arranges the audio data in the subsequent region of 72 bytes. In the fourth block composer 109, one piece of input auxiliary data is composed into a fourth block of 5 bytes as shown in FIG. 2(d). A dummy data generator 110 generates dummy data of 1 bytes as shown in FIG. 2(e) to compose as a fifth block. The first block, second block, third block, and fourth block are fed into a switch 111. The switch 111 is controlled by a selector 117, and feeds any one block into an error correction encoder 112. The input block is error correction code encoded, and is fed into a switch 113. The first blocks and second blocks are encoded together in the error correction encoder 112 to generate outer parities, and the outer parities are composed into a block of 77 bytes, and every block of third and outer parities is encoded in the error correction encoder 112 to generate an inner parity and add the inner parity to the block.

Figure 9:
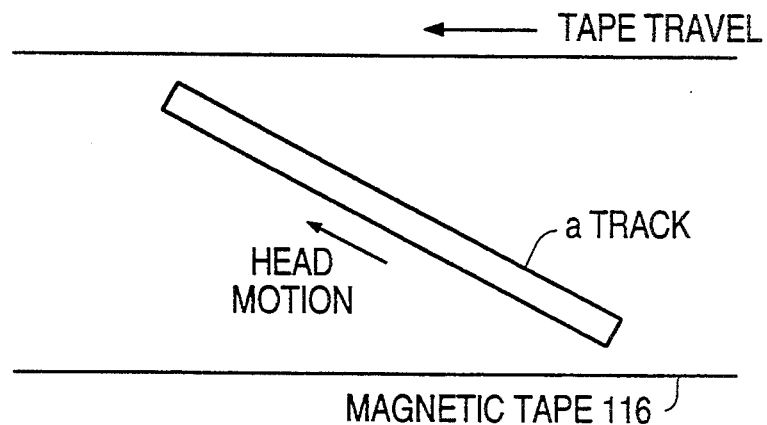
FIG. 9 s a pattern of a track formed on a magnetic tape by a digital signal recording apparatus.

In the switch 113, a fifth block generated in the dummy data generator 110 is fed. The switch 113 is also controlled by a selector 117, and selects the input block according to the selector 117, and issues to a modulator 114. In the modulator 114, a sync pattern and a block address for detecting the block are connected before the block, and modulated as a sync block, and a modulated signal is issued to a recording head 115. In the recording head 115, the modulated signal is recorded in a magnetic tape 116. Each track is formed on the magnetic tape 116 as shown in FIG. 9.

The track pattern composed by the recording apparatus of the first embodiment is shown in FIG. 3(a).

Figure 3:
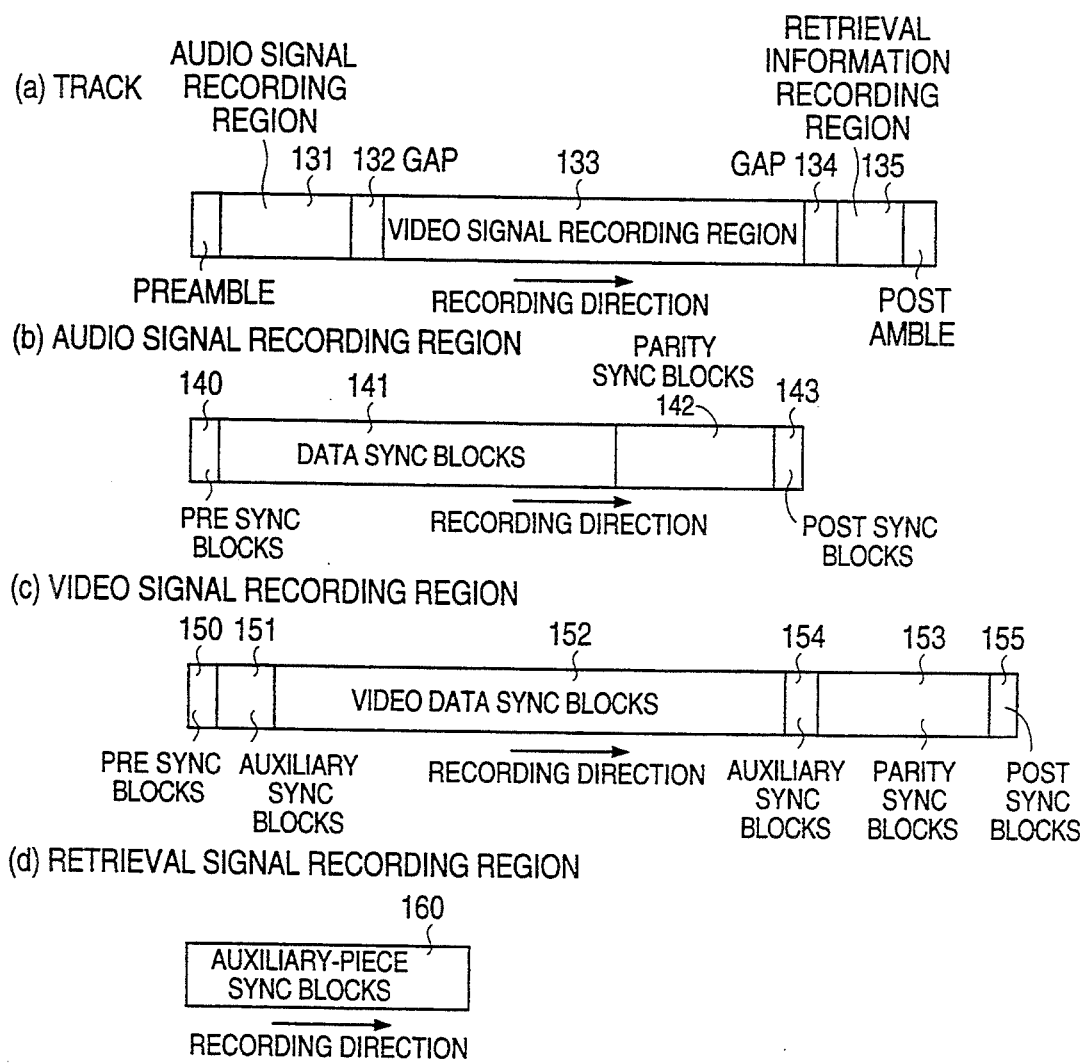
FIG. 3 is a structural diagram of a track of the invention.
Figure 4:
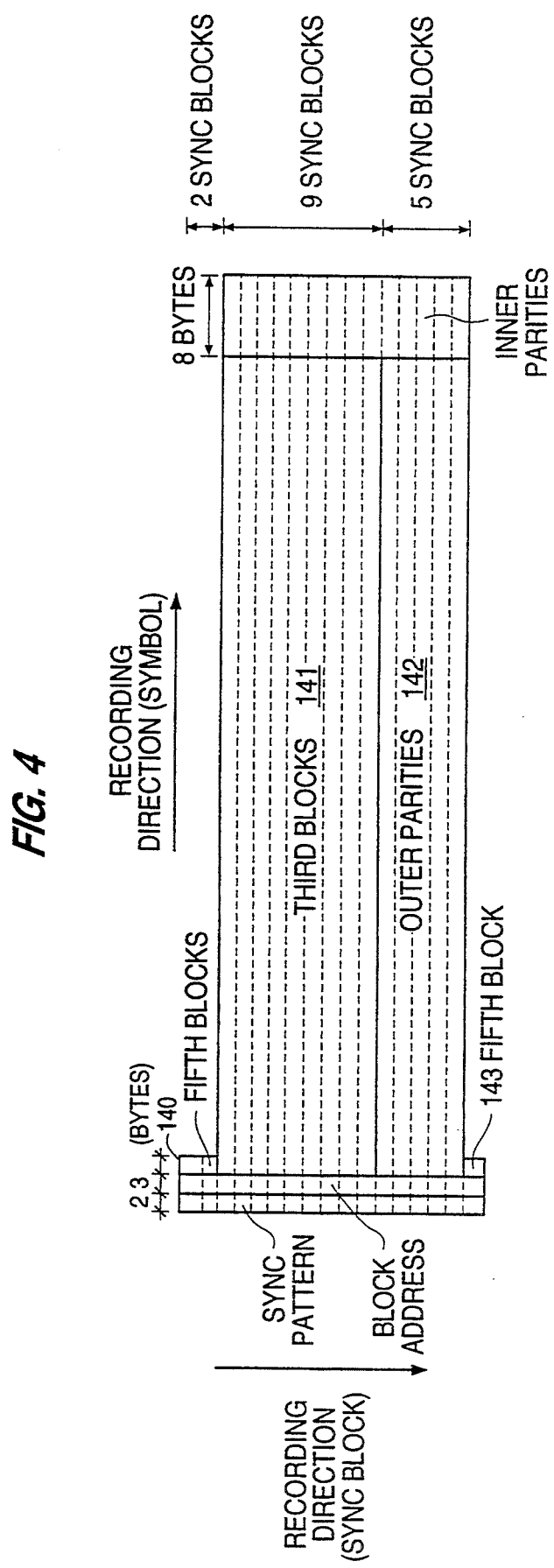
FIG. 4 is a structural diagram of an audio signal recording region of the invention.

Gaps 132 and 134 are recorded among an audio signal recording region 131, a video signal recording region 133, and a retrieval information recording region 135. The gaps 132 and 134 are provided so as not to interfere with another region when rewriting each recording region independently. In the audio signal recording region 131, as shown in FIG. 3(b), pre sync blocks 140, data sync blocks 141 composed of audio data and auxiliary data, parity sync blocks 142 composed of outer parities generated by error correction encoder 112 from the data sync blocks 141, and post sync blocks 143 are recorded. The pre sync blocks 140 and post sync blocks 143 are sync blocks composed of the fifth block formed in the dummy data generator 110. The data sync block 141 is a sync block composed of the blocks formed in the third block composer 108. A specific configuration is shown in FIG. 4.

Figure 5:
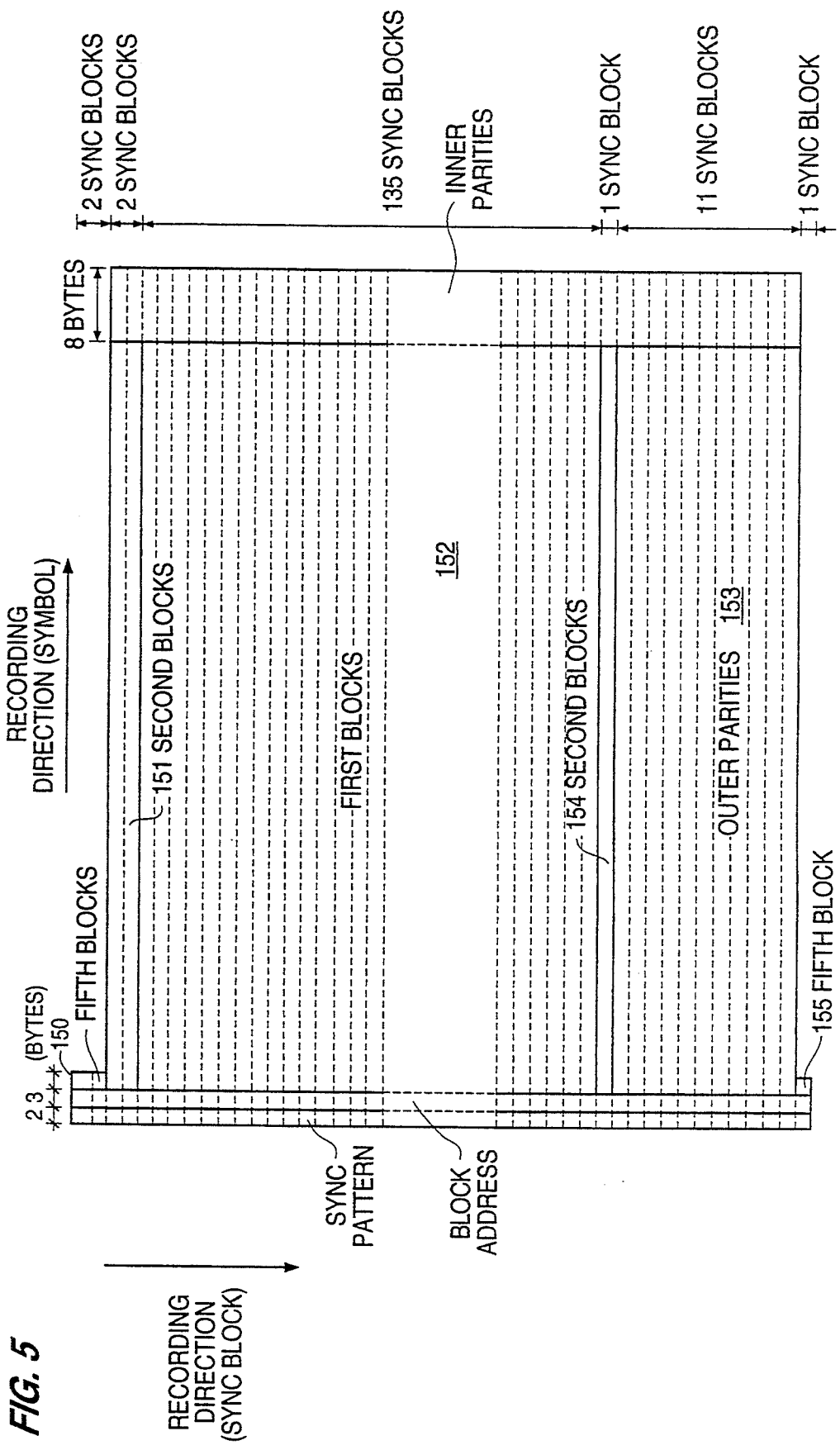
FIG. 5 is a structural diagram of a video signal recording region of the invention.

The data arrangement of the video signal recording region 133 is shown in FIG. 3(c). In the video signal recording region 133, the same as in the audio signal recording region 131, pre sync blocks 150 are recorded at the beginning, and post sync blocks 155 are recorded at the end. Auxiliary data and video data are recorded as independent blocks, and the auxiliary data is further dispersed in two positions and recorded. Herein, a parity sync block 153 is a sync block composed of outer parities by error correction encoder 112 from the auxiliary sync blocks 151, 154 and the data sync blocks 152. The pre sync blocks 150 and post sync blocks 155 are composed of the fifth block formed in the dummy data generator 110. A video sync block 152 is composed of the first block formed in the first block composer 106, and the auxiliary sync blocks 151 and 154 are composed of the second block formed in the second block composer 107. A specific configuration is shown in FIG. 5.

Figure 6:
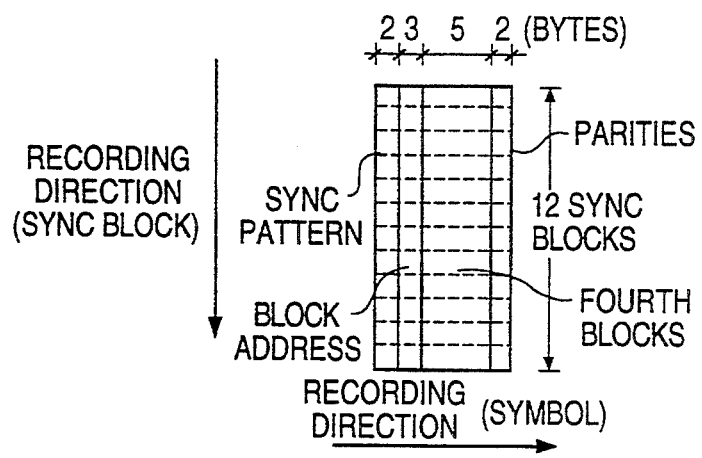
FIG. 6 is a structural diagram of a retrieval information recording region of the invention.

The data configuration of the retrieval information recording region 135 is shown in FIG. 3(d). An auxiliary-piece sync block 160 recorded in the retrieval information recording region 135 is composed of a block formed in the fourth block composer 109. A specific configuration is shown in FIG. 6.

The selector 117 for recording the tracks in these configurations controls the switches 111, 113.

Figure 8:
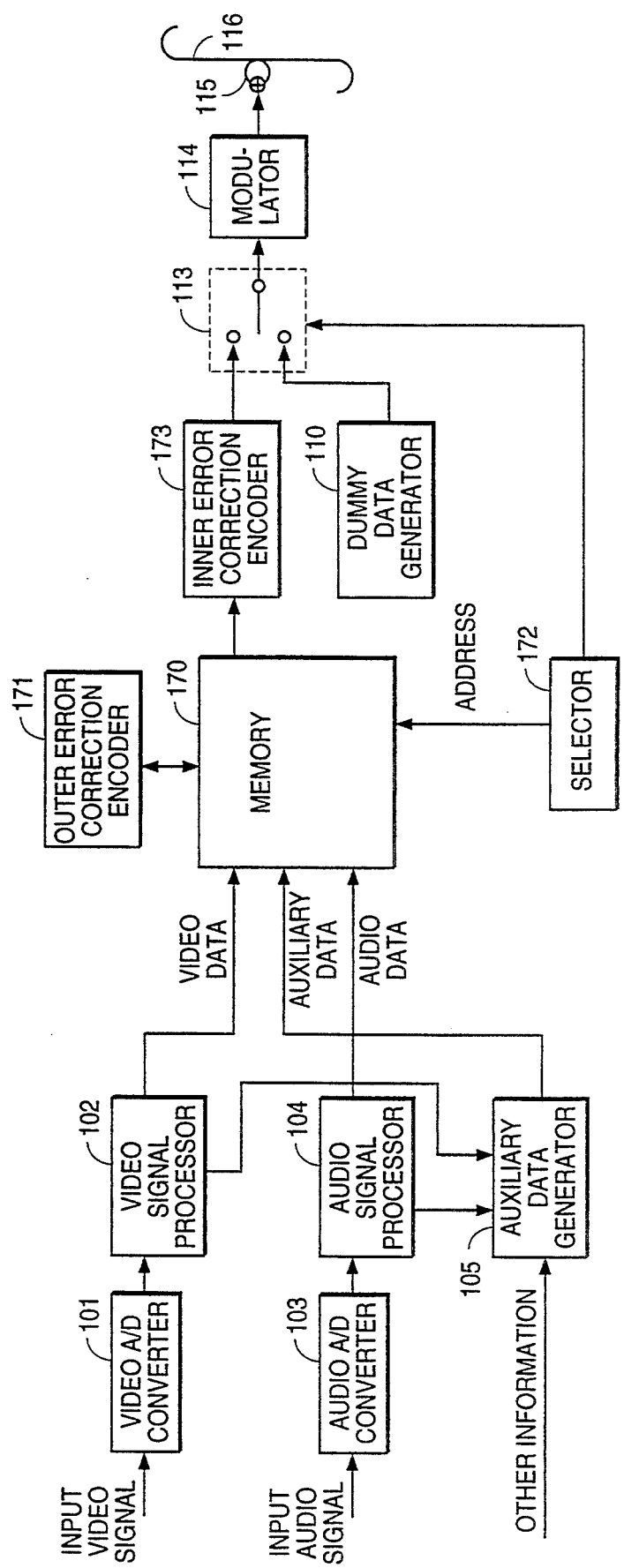
FIG. 8 is a block diagram of a digital signal recording apparatus in a second embodiment of the present invention.

FIG. 8 shows a second embodiment of the digital data recording apparatus of the invention.

Instead of the first block composer 106, second block composer 107, third block composer 108, fourth block composer 109, switch 111, error correction encoder 112, and selector 117 of the first embodiment shown in FIG. 1, it is also possible to use the memory 170, outer error correction encoder 171, inner error correction encoder 173, and a selector 172 shown in FIG. 8.

Figure 2:
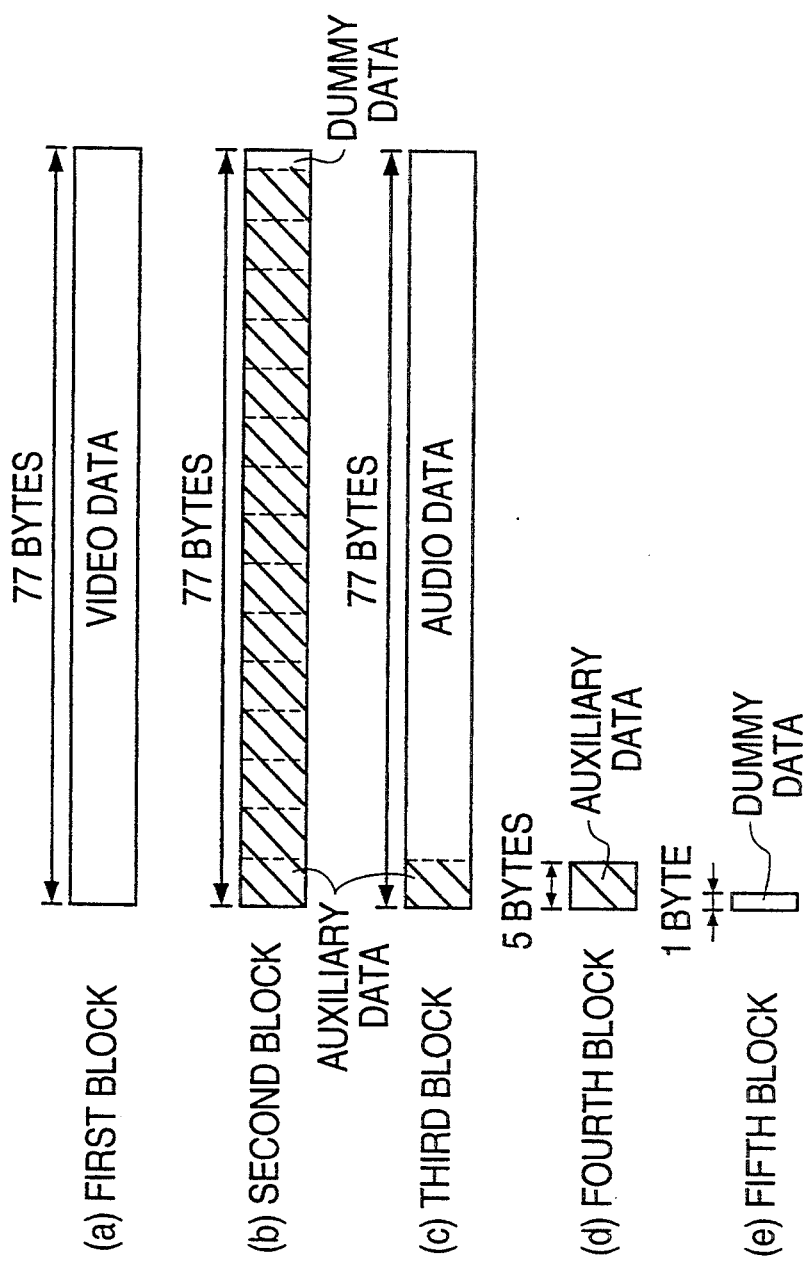
FIG. 2 is a structural diagram of a block of the invention.

At this time, the generated audio data, video data, and auxiliary data are stored in a memory 170 according to the address generated by a selector 172. The input data is subjected to error correction coding in an outer error correction encoder 171, and the outer parities are stored in a memory 170. The data stored in the memory 170 is issued to an inner error correction encoder 173. Herein, the selector 172 controls the memory 170 and switch 113 so that each block may be a block as shown in FIG. 2, and that the configuration on the track may be as shown in FIG. 3.

In the thus composed digital data recording apparatuses, all auxiliary data are allocated at the beginning of a block or sequentially from the beginning. By forming the auxiliary data as data of fixed length, the position of the auxiliary data in the block is fixed, and it is made easy to detect the auxiliary data in the block. For example, when using auxiliary data of variable length, it is necessary to calculate the length of the auxiliary data or detect the beginning mark whenever detecting certain auxiliary data. As compared with these cases, these apparatus can reduce the circuit scale. Further, recording in a fixed length makes it possible to prevent propagation of error in case that an error remains after error correction, so that the auxiliary data can be detected securely.

Moreover, in such a constituted digital data recording apparatus, for the auxiliary data, the same error correction code as in the video data or audio data can be used. By using the same error correction code, as compared with the case of error correction coding by auxiliary data alone, the error correction capability may be enhanced, and also the circuit may be shared, so that the circuit scale may be reduced.

In the video signal recording region 133, the auxiliary signal is dispersed in two positions, auxiliary sync blocks 151 and 154. One piece of the auxiliary data is recorded on plural tracks repeatedly, and each location within a track is mutually different in adjacent tracks. Then, if one set of auxiliary data is lost due to a scratch on the tape in the longitudinal direction or the like, the other set of auxiliary data can be obtained. Therefore, the error correcting probability of the auxiliary data containing important information can be strengthened without increasing the redundancy rate. If one piece of the auxiliary data is recorded on plural tracks repeatedly and all data are assigned the same location within a track, it is highly possible that the video sinal may not be reproduced, whenever an error remains after error correction in the auxiliary sync block due to a scratch of the tape in the longitudinal direction. To avoid this, if the auxiliary data is assigned to plural positions in one track, the redundancy rate becomes so high.

Figure 7:
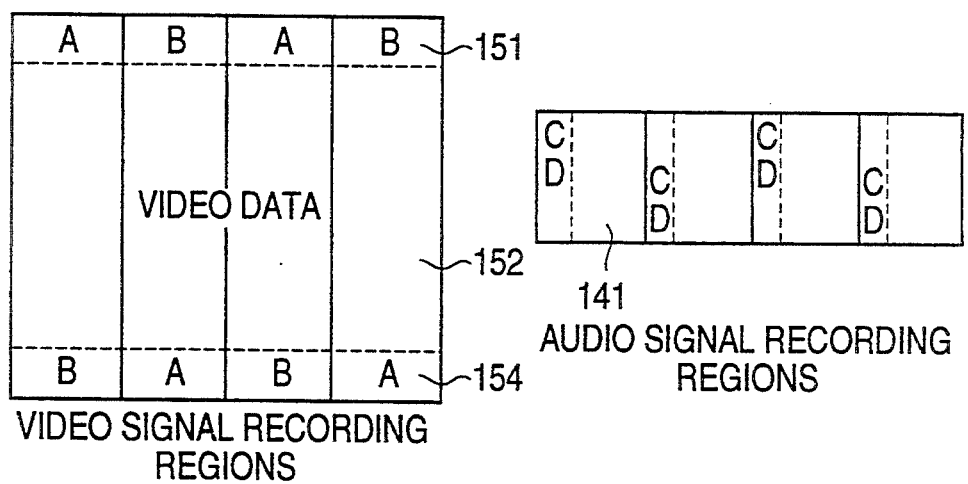
FIG. 7 is an arrangement diagram of auxiliary data of the invention.

As shown in FIG. 7, in the video signal recording region 133, if a piece of auxiliary data A is assigned to the auxiliary sync blocks 151 in a track, then it is assigned to the auxiliary sync blocks 154 in the next track, too. Similarly, if a piece of auxiliary data B is assigned to the auxiliary sync blocks 154 in a track, then it is assigned to the auxiliary sync blocks 151 in the next track. By recording in this way, when a uncorrectable error occurs in the longitudinal direction of the magnetic tape, the auxiliary data can be reproduced securely without increasing the redundancy rate. In the audio signal recording region 131, if the data sync blocks located in the beginning of the region are used for the auxiliary data C and D in a track, then the data sync blocks located in the end of the region are used for the auxiliary data C and D. Thus, when a uncorrectable error occurs in the longitudinal direction of the magnetic tape, the auxiliary data can be reproduced securely without increasing the redundancy rate.

In this embodiment, the sync block composed of first block, second block, third block, and outer parity is disposed as shown in FIGS. 4, 5, 6, but this configuration is arbitrary, and the same effects are obtained if configured differently from the embodiment.

The error correction coding and parity configuration used in the invention are only examples, and the same effects are obtained by using error correction code or by using triple or more product codes.

The auxiliary data is the information in Table 1, but other information may be recorded according to the digital data to be recorded, or the information in Table 1 may not be recorded. Further, the auxiliary data in a certain region may be recorded in another region.

Herein, one piece of auxiliary data is 5 bytes long, but the effects of the invention may be obtained if the length is different as long as it is fixed. Further, instead of composing the video data in a block of 77 bytes and audio data in a block of 72 bytes, the effects of the invention are obtained also in other values. The number of sync blocks in each region is also an example, and the same effects are obtained in other values, too.

Concerning the sync pattern, as long as each sync block can be recognized, its bit pattern and size may be freely chosen. As for the block address, too, the manner of addressing is not restricted as long as each sync block can be identified.

The length of pre sync block and post sync block composed of the dummy data is arbitrary.

The bit pattern of the dummy data is arbitrary, and a fixed bit pattern may be recorded, or information may be recorded.

When reproducing a thus composed track, in a normal play mode, since inner parities and outer parities are added, the error correction capability on auxiliary data is sufficient, and moreover it is possible to avoid loss of the entire signal due to loss of the auxiliary data.

The constitution of the embodiment is only an example, and the configuration of the audio signal recording region, video signal recording region, and retrieval information recording region is arbitrary, and may be varied as required, or a signal may not be always recorded.

Instead of dividing the auxiliary data into two, it may be divided into any number. The information of which loss may lead to impossibility of reproduction of the video signal is assigned in double, but it may be triple or more. Other auxiliary data may be also assigned in multiplicity. Incidentally, as for multiple assigned data, when adding outer parities, by arranging so as to form elements of different codewords, the error correction capability in a normal play mode may be further reinforced.

What is claimed is:

1. A recording apparatus for recording main data and associated auxiliary data on a recording medium, comprising:
   first encoding means for encoding an input first digital signal to obtain first main data;
   second encoding means for encoding an input second digital signal to obtain second main data;
   auxiliary data generating means for generating first auxiliary data of fixed data length containing information related to the first main data, second auxiliary data of fixed data length containing information related to the second main data, and third auxiliary data of fixed data length containing other information;

first block composing means for composing said first main data in a first predetermined data length into a first block;

second block composing means for sequentially arranging a first predetermined number of said first auxiliary data to compose a second block;

third block composing means for sequentially arranging a single said second auxiliary data and said second main data in a second predetermined data length to compose a third block;

fourth block composing means for composing each said third auxiliary data of fixed data length into a fourth block;

dummy data generating means for generating a dummy data;

block arranging means for arranging said first, second, third and fourth blocks along with said dummy data into recording blocks to form a first recording block composed of sequentially arranged at least one said dummy data, at least one said second block and at least one said first block, a second recording block composed of sequentially arranged at least one said dummy data and at least one said third block, and a third recording block composed of at least one said fourth block, and for arranging said first, second and third recording blocks in a predetermined order; and recording means for recording an output of said block arranging means through modulation on a recording medium in the form of a plurality of tracks such that at least one set of said first, second and third recording blocks is recorded on each of the plurality of tracks with a gap between each adjacent two of said first, second and third recording blocks.

2. An apparatus according to claim 1, wherein said block arranging means further arranges at least one said second block, at least one said first block and at least one said second block sequentially in this order to form another first recording block.

3. An apparatus according to claim 2, wherein said block arranging means prepares said first recording block and said another first recording block such that at least one said second block arranged before said at least one said first block in said first recording block and said at least one said second block arranged after said at least one said first block in said another first recording block contain at least one same auxiliary data, and wherein said recording means records said first recording block and said another first recording block respectively on adjacent two tracks of said recording medium.

4. An apparatus according to claim 1, wherein said input first digital signal is a digital video signal.

5. An apparatus according to claim 4, wherein said input second digital signal is a digital audio signal.

6. An apparatus according to claim 1, wherein said block arranging means includes error correction encoding means for performing error correction encoding, and forms said first recording block to be composed of sequentially arranged at least one said dummy data, at least one said second block, at least one said first block and at least one parity block produced by error correction encoding said at least one said second block and said at least one said first block, and said second recording block to be composed of at least one said dummy data, at least one said third block and at least one parity block obtained by error correction encoding said at least one said third block.

7. An apparatus according to claim 1, wherein said block arranging means forms said second recording block and another second recording block each containing a plurality of said third blocks such that said second auxiliary data of a j-th one of said plurality of third blocks in said another second recording block is the same auxiliary data as said auxiliary data of an i-th one of said plurality of third blocks in said second recording block, where i is not equal to j, and wherein said recording means records said second recording block and said another second recording block respectively on adjacent two tracks on said recording medium.

* * * * *